United States Patent [19]

Bernstein

[11] Patent Number: 5,296,307
[45] Date of Patent: Mar. 22, 1994

[54] LAMINATED PAPER POLYOLEFIN PAPER COMPOSITE

[75] Inventor: Bruce S. Bernstein, Rockville, Md.

[73] Assignee: Electric Power Research Institute, Inc., Palo Alto, Calif.

[21] Appl. No.: 879,942

[22] Filed: May 8, 1992

[51] Int. Cl.⁵ .............................. B32B 9/00
[52] U.S. Cl. ...................... 428/537.5; 428/172; 428/323; 428/324; 428/372; 428/521; 428/922; 156/209
[58] Field of Search ............. 428/537.5, 521, 372, 428/922, 172, 323, 324; 156/209

[56] References Cited

U.S. PATENT DOCUMENTS

| | | | |
|---|---|---|---|
| 3,482,033 | 12/1969 | Kenney et al. | 174/102 R |
| 4,673,607 | 6/1987 | Hata et al. | 428/172 |
| 4,701,766 | 1/1989 | Aida et al. | 346/1.1 |
| 4,707,517 | 11/1987 | Bullen et al. | 525/72 |
| 4,732,722 | 3/1988 | Aida et al. | 264/105 |
| 4,762,965 | 8/1988 | Hata et al. | 428/383 |
| 4,795,769 | 1/1989 | Henkel et al. | 523/219 |
| 4,806,424 | 2/1989 | Schultz | 428/372 |
| 4,812,500 | 3/1989 | Hayden | 524/99 |
| 4,859,804 | 8/1989 | Hata et al. | 428/377 |
| 4,964,933 | 10/1990 | Hata et al. | 156/209 |
| 5,180,631 | 1/1993 | Amano | 428/236 |

*Primary Examiner*—Patrick J. Ryan
*Assistant Examiner*—Abraham Bahta
*Attorney, Agent, or Firm*—Heller, Ehrman, White & McAuliffe

[57] ABSTRACT

The use of inorganic additives such as mica in the polyolefin layer of paper polyolefin paper laminates improves the electrical characteristics, gives resistance to discharge, and facilitates reduction of swelling in contact with oil. Accordingly, the present invention provides laminated paper polyolefin paper composites comprising first and second fiber paper layers, and a polyolefin layer comprising an inorganic additive such as mica.

7 Claims, 1 Drawing Sheet

LAMINATED PAPER POLYOLEFIN PAPER COMPOSITE

BACKGROUND OF THE INVENTION

The present invention relates to laminated paper polyolefin paper composites used in high voltage cables. These composites are formed by bonding together fiber paper layers of paper grade cellulose and a polyolefin layer. The invention relates more specifically to composites which have increased discharge resistance and which swell less than conventional composites when contacted with insulating oils.

Polyolefin laminate paper has good dielectric characteristic and high dielectric strength. Therefore, it is often used as an insulating material for high voltage or extra high voltage cables. However, various difficulties are present in conventional polyolefin laminates which prevent their use as replacements for more common paper insulation for transmission cable applications. One of these difficulties is the occurrence of partial discharges when there are flaws or air spaces in the laminates. Another difficulty is the swelling of the polyolefin layer which occurs when it is contacted with insulating oils. This swelling causes the tape not to slide and therefore wrinkle; it also leads to a reduction in dielectric strength of the polypropylene.

Various methods have been used to attempt to provide a superior laminated insulation construction. A first method is an "annealing method" where a cable, after taping, is subjected to a heat treatment carried out in a vacuum at a temperature lower than the melting point of polyolefin for a predetermined period of time to increase the degree of crystallinity of the polyolefin film, and thereby decrease swelling in the insulating oil. A second method is a "humidity adjusting method" where the paper layers are caused to absorb moisture to expand in advance; the decrease in thickness of the paper layers caused by drying after the taping operation is utilized to counter the increase in thickness of the polyolefin film layer which is caused by the swelling. A third method is an "after-embossing method" in which a paper polyolefin laminate is embossed so that irregularities are mechanically formed thereon. Deformation of these irregularities absorbs the increase in thickness of the polyolefin layer when it is swelled in the insulating oil. A fourth method is a "pre-embossing method" in which the paper layers are embossed prior to lamination.

It is an object of the present invention to provide laminate paper polyolefin paper composites which are discharge-resistant.

It is a further object of the present invention to provide laminate paper polyolefin paper composites which exhibit reduced swelling on contact with insulating oils.

Methods for making the above-referenced composites are also provided as yet a further object of this invention.

It is yet a further object of the present invention to provide high voltage cables with improved discharge-resistance and swelling characteristics. This in turn will lead to longer life and greater reliability.

SUMMARY OF THE INVENTION

The use of inorganic additives such as mica in the polyolefin layer of paper polyolefin paper laminates improves the electrical characteristics, gives resistance to discharge, and facilitates reduction of swelling in contact with oil.

Accordingly, the present invention provides laminated paper polyolefin paper composites comprising first and second fiber paper layers, and a polyolefin layer comprising an inorganic additive such as mica.

The present invention also provides methods for making the above-mentioned composites.

The present invention also provides discharge-resistant high-voltage cables with reduced swelling made with the above-mentioned composites.

These and other aspects of the present invention will be set forth below and in the claims.

DESCRIPTION OF THE PREFERRED EMBODIMENTS

Mica-filled polypropylene is a commonly available material used in structural applications. It is not presently employed in the cable industry or in electrical or utility applications. The present invention utilizes the discharge-resistant quality of specific inorganic additives, such as mica, to improve laminated paper polyolefin paper composites by adding appropriate inorganic additives to the polyolefin layer of these composites. These additives also facilitate swelling reduction on contact with insulating oils.

Figure 1:
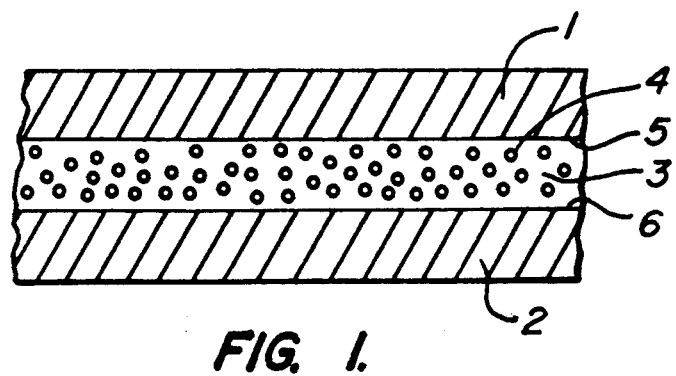
FIG. 1 is a schematic diagram of one embodiment of the paper polyolefin paper laminate of the present invention with an inorganic additive in the polyolefin layer.

FIG. 1 is a schematic diagram of the laminated paper polyolefin paper composite of the present invention with inorganic additives 4 in polyolefin layer 3. First and second paper layers 1,2 are laminated to polyolefin layer 3 at interfaces 5,6. Although not illustrated in the figure, the laminated composite may be embossed.

Inorganic additives 4 which are useful are those which will increase the discharge resistance of the composite at weight-percent levels of about 0.05 to 5.0% which will keep the stiffness adequately low and give an acceptable impact strength. Useful additives include silicates. A preferred embodiment includes mica at a level of about 0.5 to 3.0%.

Various polyolefins may be used to form polyolefin layer 3, including polypropylene and polymethylpentene as preferred embodiments. A useful thickness of polyolefin layer 3 is from about 1½ to 3 mils. A preformed or prefabricated extruded film or sheet including an inorganic additive is preferably used to form the polyolefin layer of the present invention.

Poly-4-methyl-pentene (polymethylpentene or PMP) is a commercially available polyolefin that has a higher melting point and lower density than polypropylene or polyethylene. Its lower density allows easier oil penetration and less probability for swelling. Using PMP in laminate paper polyolefin paper composites used as cable insulation gives a more reliable transmission cable. Use of PMP in the laminate paper polyolefin paper composites of the present invention may also reduce the cost of final construction compared to conventional composites.

Means for laminating paper layers 1,2 to polyolefin layer 3 at interfaces 5,6 in the present invention preferably include melting a portion of polyolefin layer 3 to bond to paper layers 1,2. Alternatively, an adhesive may be used at interfaces 5,6 of the layers of the composite.

Figure 2:
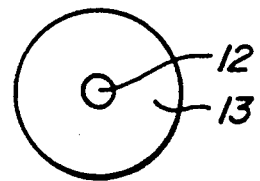
FIG. 2 is a cross section of one embodiment of the cable of the present invention.

FIG. 2 is a schematic diagram of a cable according to the present invention. Conductor core 12 is covered with a plurality of laminate paper polyolefin paper composite layers 13. These layers are composed of laminates with one of the structures and compositions described above. Preferred embodiments include composites where the polyolefin layer is polypropylene-mica or polymethylpentene-mica.

Cables according to the present invention as shown in FIG. 2 are useful as high-voltage cables. Anticipated voltage ranges include 15–35 kV cables, as well as transmission cables in the 46–765 kV range. They are economical to make, discharge resistant, and show good flow of insulating oil due to reduced swelling of the composite layers. Thus, cables according to the present invention give more reliable transmission.

The foregoing descriptions of specific embodiments of the present invention have been presented for purposes of illustration and description. They are not intended to be exhaustive or to limit the invention to the precise forms disclosed, and it should be understood that many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A laminated paper polyolefin composite comprising first and second fiber paper layers each laminated to a polyolefin layer containing silicates which impart discharge resistance to said composite.

2. A composite as in claim 1 wherein said polyolefin comprises polypropylene.

3. A composite as in claim 1 wherein said polyolefin comprises polymethylpentene.

4. A composite as in claim 1 wherein said silicates comprise mica.

5. A composite as in claim 1 wherein said polyolefin layer comprises sheets.

6. A composite as in claim 1 wherein said polyolefin layer contains 0.05 to 5.0% of said silicates.

7. A composite as in claim 4 wherein said polyolefin layer contains 0.5 to 3.0% mica.

* * * * *

UNITED STATES PATENT AND TRADEMARK OFFICE
CERTIFICATE OF CORRECTION

PATENT NO. : 5,296,307
DATED : March 22, 1994
INVENTOR(S) : Bruce S. Bernstein

It is certified that error appears in the above-indentified patent and that said Letters Patent is hereby corrected as shown below:

Abstract:
  Line 5, please delete the sentence that begins with "Accordingly," and ends with "mica."

Signed and Sealed this

Eighth Day of November, 1994

Attest:

BRUCE LEHMAN

Attesting Officer     Commissioner of Patents and Trademarks